United States Patent
Bogdahn et al.

(10) Patent No.: US 7,891,213 B2
(45) Date of Patent: Feb. 22, 2011

(54) VERTICAL DRAWING METHOD FOR PRODUCING A CYLINDRICAL GLASS BODY AND DEVICE FOR CARRYING OUT SAID METHOD

(75) Inventors: Thomas Bogdahn, Karlstein (DE); Oliver Ganz, Bruchkoebel (DE); Harald Hain, Kahl (DE); Eric Emmert, Eschweiler (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 565 days.

(21) Appl. No.: 10/581,760

(22) PCT Filed: Nov. 26, 2004

(86) PCT No.: PCT/EP2004/013402

§ 371 (c)(1),
(2), (4) Date: Jun. 5, 2006

(87) PCT Pub. No.: WO2005/054140

PCT Pub. Date: Jun. 16, 2005

(65) Prior Publication Data

US 2007/0119214 A1 May 31, 2007

(30) Foreign Application Priority Data

Dec. 4, 2003 (DE) .............................. 103 57 063

(51) Int. Cl.
*C03B 37/07* (2006.01)
(52) U.S. Cl. .............................. 65/378; 66/382; 66/484
(58) Field of Classification Search .................... 65/378, 65/382, 377
See application file for complete search history.

(56) References Cited

U.S. PATENT DOCUMENTS 4,410,344 A   10/1983   Iyengar et al.
(Continued)

FOREIGN PATENT DOCUMENTS

DE   36 25 733 A1   2/1988

(Continued)

OTHER PUBLICATIONS

English language Abstract for JP 10 114536 published Sep. 2, 1998.

(Continued)

*Primary Examiner*—Jason L Lazorcik
*Assistant Examiner*—Cynthia Szewczyk
(74) *Attorney, Agent, or Firm*—Tiajoloff and Kelly LLP

(57) ABSTRACT

According to a known vertical drawing method for producing a cylindrical glass body, the cylinder longitudinal axis of the glass cylinder is adjusted by hand in relation to the longitudinal axis of a heating tube. The aim of the invention is to optimize the stability of said glass body. Said aim is achieved, whereby adjustment comprises the steps of detecting a value for a first radial x-y position of the cylinder longitudinal axis (16) of the glass cylinder (4) in a first horizontal detection plane (E1), drawing the glass cylinder (4), placed in the first x-y position, to form a test glass strand (10), measuring an actual state of a radial circular, or annular dimension of the test glass strand, determining a deviation between the actual state and a set state of said circular, or annular dimension with regard to the size and position thereof, while considering the position of the glass cylinder (4) in relation to the inner wall of the heating tube (1) during drawing, calculating a corrected x-y position of the cylinder longitudinal axis (16) by means of a correction factor (K), the value and position of the deviation, arranging the glass cylinder (4) into the heating tube (1), so that the cylinder longitudinal axis (16) extends at least in the first horizontal detection plane (E1) in the x-y position and drawing the glass cylinder (4), arranged in the corrected x-y position, to form another test glass strand (10).

22 Claims, 2 Drawing Sheets

U.S. PATENT DOCUMENTS

Figure 1:
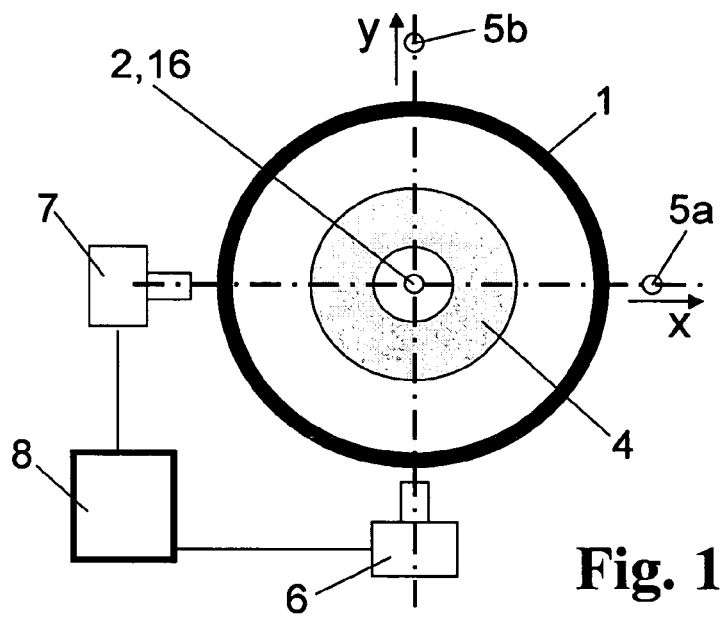

| | | | |
|---|---|---|---|
| 5,676,724 A * | 10/1997 | Barre et al. | 65/382 |
| 5,785,729 A * | 7/1998 | Yokokawa et al. | 65/385 |
| 6,098,428 A * | 8/2000 | Bogdahn et al. | 65/381 |
| 6,131,414 A * | 10/2000 | Shimizu et al. | 65/378 |
| 6,178,778 B1 | 1/2001 | Kenmochi et al. | |
| 6,715,317 B1 * | 4/2004 | Brauer et al. | 65/29.14 |
| 6,742,363 B1 * | 6/2004 | Yamamura et al. | 65/377 |
| 2007/0125127 A1 * | 6/2007 | Fleming et al. | 65/377 |

FOREIGN PATENT DOCUMENTS

| | | |
|---|---|---|
| DE | 199 08 623 A1 | 5/2000 |
| DE | 101 17 153 C1 | 6/2002 |
| EP | 0 598 349 A2 | 5/1994 |
| JP | 56 088841 A | 7/1981 |
| JP | 07 017736 A | 1/1995 |
| JP | 10 114536 A | 5/1998 |
| JP | 10 231136 A | 9/2002 |
| WO | WO 02/081393 A1 | 10/2002 |

OTHER PUBLICATIONS

English language Abstract for JP 10 231136 published May 6, 1998.
English language Abstract for JP 56 088841 published Jul. 18, 1981.
English language Abstract for JP 7-0177736 published Jan. 20, 1995.

* cited by examiner

VERTICAL DRAWING METHOD FOR PRODUCING A CYLINDRICAL GLASS BODY AND DEVICE FOR CARRYING OUT SAID METHOD

The present invention relates to a vertical drawing method for producing a cylindrical glass body, particularly of quartz glass, comprising continuously feeding a glass cylinder to a heating zone having a vertically oriented heating tube, adjusting the longitudinal cylinder axis of the glass cylinder relative to the longitudinal axis of the heating tube, zonewise softening the glass cylinder, drawing a glass strand from the softened glass cylinder, and cutting the glass strand to size to obtain the cylindrical glass body.

Furthermore, the present invention relates to an apparatus for producing a cylindrical glass body by means of a vertical drawing method, comprising a heating zone which includes a vertically oriented heating tube, and an adjusting means for adjusting the longitudinal cylinder axis of a glass cylinder to be drawn relative to the longitudinal axis of the heating tube.

Such methods and apparatus serve the manufacture of cylindrical components, particularly tubes and rods of quartz glass of any desired cross-sectional profile, of preforms for optical fibers, or the optical fiber itself. DE 101 17 153 A describes a vertical drawing process for producing a solid cylinder of quartz glass by drawing from a hollow cylinder. A quartz glass cylinder is here supplied in tube or rod form in vertical orientation from above to a heating tube and is softened therein zonewise, and a glass strand is drawn off from the softened region by means of a dragger, a drawing bulb being formed in the softened region of the quartz glass cylinder. The radial orientation of the quartz glass cylinder approximately relative to the central axis of the heating tube is carried out by the eye.

The optimum drawing position of the quartz glass cylinder inside the heating tube can however not be sensed and adopted with aiming accuracy. It has been found that the position of the quartz glass cylinder inside the heating tube has a decisive influence on the quality of the glass body obtained therefrom. Observed are oval shapes of the radial cross-section of the glass bodies, eccentricities between core and cladding in glass bodies in the form of preforms and optical fibers. An essential parameter for the assessment of the fiber quality is the fiber bend adopted by a freely movable fiber (designated as "fiber curl"). The fiber curl is caused by deviations from the ideal cylinder symmetry, either in the preform or during drawing of a coaxial arrangement of components during drawing according to the rod-in-tube technique, as is e.g. described in EP 0 598 349 A1. Moreover, bends of the drawn-off glass strand of less than 0.5 mm/m without control of the axial orientation of the longitudinal cylinder axis relative to the drawing axis cannot be obtained in a reproducible manner.

Attempts have been made to compensate for radially inhomogeneous heating by rotation of the glass cylinder about its longitudinal axis. This, however, requires great efforts as to apparatus and control techniques.

It is therefore the object of the present invention to provide a method and an apparatus for optimizing the dimensional stability of the cylindrical glass bodies obtained by vertical drawing without rotation of the same and it should particularly be made possible to determine an optimum drawing position of the cylinder inside the heating tube and to adopt the same in a targeted manner.

As for the method, this object, starting from a method of the above-mentioned type, is achieved according to the invention in that the adjusting operation comprises sensing a value for a first radial xy-position of the longitudinal cylinder axis of the glass cylinder in a first horizontal sensing plane, drawing the glass cylinder arranged in the first xy-position into a test glass strand, and carrying out the following method steps once or repeatedly:

a) measuring an actual state of a radial circular or annular dimension of the test glass strand, b) determining a deviation between the actual state and a desired state of the circular or annular dimension with respect to its size and position in consideration of the position of the glass cylinder relative to the inner wall of the heating tube during drawing, c) calculating a corrected xy-position of the longitudinal cylinder axis on the basis of a correction factor and the size and position of the deviation, d) installing the glass cylinder in the heating tube such that the longitudinal cylinder axis extends at least in the first horizontal sensing plane in the corrected xy-position, and e) drawing the glass cylinder installed in the corrected xy-position to obtain a further test glass strand.

The heating tube is normally a component of graphite or of a ceramic material. Due to manufacturing variations the heating tube may show a radially inhomogeneous distribution of the density. Such inhomogeneities inside the heating tube wall and axial asymmetries in the furnace structure disturb the characteristic of the temperature field and particularly result in an axially asymmetric temperature distribution inside the heating tube. Other interfering factors of the heating furnace are, for instance, an existing insulation around the heating tube, or drawing parameters, such as temperatures, gas flows, or the radial cross-section of the glass cylinder.

In response to the asymmetry of the temperature field and the position of the glass cylinder inside said temperature field, a systematic dimensional deviation is found in the rod or tube geometry of the drawn-off glass strand. Oval shapes of the cross section are found in rods and tubes, and a "wall one-sidedness" is observed in tubes, which means a radially irregular profile of the tube wall thickness. Moreover, there might be an axial bend of the glass strand.

It has now been found that within each heating tube there is at least one radial xy-position at which the glass cylinder arranged there is subjected to a uniform and substantially axially symmetrical heating, so that during drawing of the glass cylinder arranged at said place a satisfactory dimensional stability of the glass strand and of the resulting glass body is achieved. The concrete position of said radial drawing position, hereinafter also called "optimum radial drawing position" or "also sweet spot", differs from heating element to heating element.

Upon exchange of the heating tube or another change with impact on the temperature profile inside the heating tube, a different optimum radial drawing position is thus obtained each time.

Therefore, according to the invention at least one "sweet spot", at which the energy input into the glass cylinder to be drawn is in radial direction as uniform as possible in the region of the drawing bulb, must be found in the disturbed temperature field of the heating tube, and the glass cylinder to be drawn must also be installed in this xy-position. During drawing of a glass cylinder arranged in a "sweet spot", the desired geometry can be adjusted particularly well and maintained during the drawing process.

A decisive factor for such an optimization is the horizontal arrangement of the longitudinal cylinder axis inside the heating tube (xy-position). In the direction of the longitudinal axis of the heating tube (z-position), the temperature changes continuously, so that the position of the glass cylinder or the drawing bulb in this direction is less critical with respect to the dimensional stability of the glass strand.

A rod, a tube, a preform, or an optical fiber is obtained from the glass strand by cutting to size. The glass cylinder is a solid cylinder, a hollow cylinder, a preform for optical fibers, or it is part of a coaxial arrangement of a so-called core rod (which provides the glass for the inner region of a fiber), and one or several cladding glass tubes surrounding the core rod, as described in EP 0 598 349 A1, and from which either a preform for an optical fiber is obtained by vertical drawing and collapsing, or the optical fiber itself.

In the method according to the invention, the adjustment of the glass cylinder relative to the longitudinal axis of the heating tube comprises one or several preliminary tests on the basis of which a "sweet spot" is found, and a method for installing the glass cylinder in the "sweet spot" found.

To this end, a glass cylinder is first drawn on a trial basis and its initial first radial xy-position is exactly sensed in a first horizontal sensing plane. For sensing the radial xy-position optical, mechanical, electrical, magnetic, capacitive or inductive methods are suited. What is just essential is that the coordinates of the corresponding xy-position are determined in a definite and quantitative way. In the case of optical sensing the first horizontal sensing plane extends above the heating tube for the sake of simplicity.

This "test glass cylinder" is either a "good cylinder" which is to be drawn into the glass body, or a "dummy cylinder" which is made from a similar material, but is of poorer quality than the "good cylinder".

The first glass cylinder is drawn into a first test glass strand which is distinguished by a radial circular or annular dimension, such as the wall thickness or the cross-sectional area. The corresponding radial circular or annular dimension is measured, so that an actual state of the radial dimension of the first test glass strand is obtained. As a rule, the actual state of the radial dimension follows from several measurements taken along the longitudinal cylinder axis of the test glass strand or of pieces thereof.

Deviations between the actual state and a desired state of the corresponding circular or annular dimension are quantified, i.e. both with respect to the magnitude of the deviation and with respect to its relative position in relation to the inner wall of the heating tube during drawing. The deviation from the desired geometry, as determined, has impacts on a displacement of the actual xy-position inside the heating tube, which displacement is to be performed subsequently, the direction of the corresponding displacement vector being here defined by the relative position of the deviation, and the length of the displacement vector by the magnitude of the deviation.

For calculating said displacement vector a correction factor may be used that differs from heating tube to heating tube and must thus be determined individually. Said correction factor quantitatively takes into account the impact of a displacement of the glass cylinder in the area of the first sensing plane on the corresponding circular or annular dimension in the drawn-off glass strand. On the basis of the calculation, a corrected value is obtained for the xy-position at which an enhanced dimensional stability of the drawn-off glass strand can be expected.

Subsequently, either the same glass cylinder or another test cylinder is installed in the heating tube such that the longitudinal cylinder axis thereof extends at least at the level of the first horizontal sensing plane in the corrected xy-position. To this end either the glass cylinder just used is newly installed in the drawing process, or the drawing process is interrupted for the new installation of this or another test cylinder. When another test cylinder is used, this may also be a "dummy cylinder" or a "good cylinder". The new installation at the corrected xy-position is done by hand or in a computer-controlled manner.

For the reproducible installation of the glass cylinder at the corrected xy-position, the measures explained above on the basis of the method step "sensing" are appropriate.

The glass cylinder which is installed exactly and reproducibly at the corrected xy-position is drawn into a further test glass strand. The effect of the correction of the xy-position on size and position of the deviation is controlled in that the drawn-off further test glass strand or parts cut therefrom are measured, as has been explained above with reference to the method steps "measuring" and "determining" (method steps a) and b)).

In the event that the deviation between the actual state and the desired state of the circular or annular dimension is satisfactorily small, the corrected xy-position is a "sweet spot", which is used for the current vertical drawing process or for subsequent drawing processes with use of the same heating tube. The glass cylinder actually used in the heating furnace can then be drawn further to the glass strand, or it is replaced by another glass cylinder which is then also used in the corrected xy-position.

Otherwise, a further corrected xy-position is calculated on the basis of the deviation found between the actual state and the desired state of the circular or annular dimension of the further test glass strand. The method steps "installing" and "drawing" (method steps c), d) and e)) are repeated on the basis of this further corrected xy-position, as has been explained above.

The method steps a) to e) are thus repeated so often that the relevant circular or annular dimension of the respective test glass strand is satisfactorily close to the desired state, so that the corresponding xy-position that has been corrected several times can be used as the "sweet spot" for the actual drawing process and for subsequent drawing processes in the same heating furnace.

The glass cylinder just installed or a test glass cylinder is here used. A further repetition of the method steps is no longer required when the drawn-off test glass strand shows an appropriately small deviation between the actual state and the desired state of the circular or annular dimension.

The correction of the xy-position of the glass cylinder with respect to the "sweet spot" and the improvement of the relevant circular or annular dimension of the drawn-off glass strand achieved thereby may be accompanied by a deterioration of another glass strand property. In particular, an axial bend of the glass strand must be paid attention to. Such a bend may occur if the central axis of the glass cylinder is outside the drawing axis. If such a deterioration of another property is no longer acceptable, a compromise must be found between this property and the relevant circular or annular dimension of the drawn-off glass strand. As a rule, it is enough to observe the corresponding properties and dimensions within the scope of a predetermined specification. If necessary, the drawing axis must be aligned with respect to a newly found "sweet spot", which encompasses a readjustment of the draw-off means.

Especially with a view thereto, the desired state corresponds to the ideal state of the corresponding circular or annular dimension or to a deviation from the ideal state that can just be accepted, as may e.g. be predetermined by a specification.

With the method of the invention it is possible to improve the quality of the drawn-off glass strand with respect to its radial dimension and particularly in a tubular glass strand with respect to its wall one-sidedness, without a rotation about the central axis of the glass cylinder being required. Different from such a rotation about the central axis, the method of the invention will also be successful if a tubular glass start cylinder is used that shows wall one-sidedness. The reason is that for the elimination of the wall one-sidedness in the drawn-off glass strand such a glass cylinder must be arranged in asymmetry with the radial temperature profile inside the heating zone.

It has turned out to be particularly useful when sensing the value for the first radial xy-position comprises the generation of an optical image of the glass cylinder in the first sensing plane and of at least part of the heating tube or a calibration body which is in stationary relationship with the heating tube, and an evaluation of the optical image.

An optical image of the arrangement of glass cylinder and heating tube inside the first sensing plane is generated by means of a suitable recording apparatus and is displayed on a display medium, such as a monitor, a display device or as a print. The coordinates that define the first radial xy-position are determined on the basis of the image in a computer-aided manner or by hand. This radial xy-position is normally the position of the central axis of the glass cylinder inside the radial heating tube cross-section. The corresponding coordinates are recorded for a possible later correction of the radial xy-position. An exact and reproducible determination of the coordinates is thus made possible in an easy way. Instead of the heating tube or as a supplement thereto, the image to be evaluated can also show a calibration body which is in a known stationary relationship with the central axis of the heating tube.

Preferably, a tubular test glass strand is drawn, the measurement according to method step a) covering the measurement of the radial wall thickness profile of the tubular test strand.

It has been found that the wall one-sidedness reacts in a particularly sensitive way to inhomogeneities of the temperature field inside the heating tube. Therefore, the "sweet spots" are also determined during drawing of a glass cylinder in the form of a solid cylinder preferably in advance on the basis of preliminary tests using one or several tubular test glass cylinders.

The measurement according to method step a) comprises the measurement of the wall thickness profile of the tubular test glass strand, the deviation of the wall geometry from the annular shape (wall one-sidedness) being measured, and the magnitude of the deviation being determined as an absolute value of the difference between the thickness of the thickest point of the tubular wall and the thinnest place. Moreover, the relative position of the thinnest place of the tubular wall in relation to the inner wall of the heating tube is determined during the drawing process (in a projection of the radial cross-section of the tube onto the first sensing plane).

Preferably, a tubular test glass strand is drawn with an outer diameter of not more than 50 mm, particularly preferably between 10 mm and 20 mm.

Test material is primarily saved with the small diameter of the tubular test strand. The amount of the deviation of the relevant circular or annular dimension, which deviation is determined on the tubular test strand, is here used for correcting the xy-position and is up-scaled to the diameter of the thicker glass strand to be drawn later.

In a particularly preferred embodiment of the method of the invention, the measurement according to method step a) is carried out during drawing, the circular or annular dimension being determined on a plurality of measurement points distributed around the circumference of the test glass strand.

The circular or annular dimension of the drawn-off test glass strand is here monitored during the drawing process and the impacts can be checked immediately due to a correction of the xy-position and corrected, if necessary. As a result, a "sweet spot" can be determined particularly rapidly. For this purpose a measuring device (particularly a wall-thickness measuring device) which circulates or oscillates around the outer circumference of the test glass strand can be used, or a plurality of stationary measuring devices (wall-thickness measuring devices) which are distributed around the circumference.

Alternatively, or in addition, the measuring operation according to method step a) is performed, following the glass-cylinder drawing operation, on pieces of the test glass strand that have been cut to size, using a stationary wall-thickness measuring device.

In this procedure, comparatively simple and inexpensive measuring equipment is adequate. The equipment is preferably used for control purposes.

It has been found that in a tubular test glass strand the distance A between the xy-position and the corrected xy-position is calculated with reference to the following dimensioning rule:

$$A = K \times \text{wall one-sidedness},$$

where K is a correction factor ranging between 5 and 40 if the wall one-sidedness is indicated as the differential amount between the maximum value and the minimum value of the wall thickness.

The correction factor covers such impacts that are constant for each drawing process using the heating means (these are substantially impacts of the heating tube), and also impacts depending on the drawing parameters. These are substantially the temperature and the geometry, homogeneity and dimensional stability of the starting glass cylinder. Apart from the heating tube, an existing oval shape or wall one-sidedness of the glass cylinder has an impact on the position of the "sweet spots". The wall one-sidedness can be determined in any arbitrary way. It can e.g. be determined as a maximum deviation from a mean wall thickness. The above correction factor will be applicable when the wall one-sidedness is indicated as a differential amount between the maximum value and the minimum value of the wall thickness.

The thinnest tube wall follows from the hottest place of the tube surface due to a positioning of a tubular test glass cylinder inside the heating tube that is asymmetrical with respect to the temperature profile. The corrected xy-position of the glass cylinder is therefore calculated such that the glass cylinder is moved away from the hottest place of the heating tube. The path of this displacement movement, i.e. the distance A between the actual value of the xy-position and the corrected value, depends on the size of the measured deviation of the tube geometry (e.g. the difference between the maximum value and the minimum value of the wall thickness of the tube) and is calculated with reference to the above dimensioning rule.

It has turned out to be advantageous when a value is determined for the first radial xy-position of the longitudinal axis of the glass cylinder in a second horizontal sensing plane which extends spaced apart from the first sensing plane.

The position of the glass cylinder is here measured inside the heating tube in two different horizontal planes, whereby an alignment of the cylinder axis is made possible in parallel with the longitudinal axis of the heating tube and the drawing direction. This leads to an improvement with respect to the bend of the glass cylinder. Cylinder pieces attached askew or also misalignments of the drawing system can thereby be corrected.

This optimizing measure is preferably only carried out after a "sweet spot" has been detected with the help of the above-explained preliminary tests and the glass cylinder has been installed accordingly in the first sensing plane.

For optimizing the orientation of the longitudinal axis of the cylinder relative to the drawing axis, different inclinations of glass cylinders are set relative to the drawing axis, the glass cylinders being each drawn into a test glass strand and a radial circular or annular dimension of the drawn-off test glass strand being evaluated, and successively corrected inclinations being calculated on the basis of said evaluation, as has been described above with reference to the tests for optimizing the radial xy-position.

In a preferred method variant, the installation of the glass cylinder according to method step d) includes a computer-controlled transportation of the glass cylinder to the corrected xy-position.

The computer-controlled transportation of the glass cylinder ensures an exact positioning on the corrected xy-position on the basis of the previously calculated data. This measure has turned out to be particularly useful in combination with an optical detection of the position of the glass cylinder, as has been explained above.

Furthermore, it has turned out to be advantageous to use a glass cylinder consisting of test material for the determination of a "sweet spot".

This measure helps to save material. For the determination of the "sweet spot" geometrically precise test glass cylinders of a cheaper material are used before the first good cylinder. These may have the same outer dimensions (outer diameter, inner diameter) as the good cylinder, or smaller outer dimensions. The test glass cylinder can also be welded to a good cylinder.

As for the apparatus, the above-mentioned technical object, starting from an apparatus of the above-mentioned type, is achieved according to the invention in that the adjusting means comprises a) a sensing means for sensing a value for a first radial xy-position of the longitudinal cylinder axis of the glass cylinder in a first horizontal sensing plane inside the heating tube, b) a measuring means for measuring an actual state of a radial circular or annular dimension of a test glass strand drawn from the glass cylinder, c) a microprocessor for determining a deviation between the actual state and a desired state of the circular or annular dimension with respect to its size and position in consideration of the position of the glass cylinder relative to the inner wall of the heating tube during drawing, and for calculating a corrected xy-position of the longitudinal cylinder axis inside the heating tube on the basis of a correction factor and the size and position of the deviation, d) and a displacement means by which the glass cylinder is installed in the heating tube such that the longitudinal cylinder axis extends at least in the first horizontal sensing plane in the xy-position.

The heating tube is normally a component of graphite which due to manufacturing variations may show a radially inhomogeneous distribution of the density. Such inhomogeneities inside the heating tube wall and axial asymmetries in the furnace structure disturb the characteristic of the temperature field and particularly result in an axially asymmetric temperature distribution inside the heating tube, which leads to systematic dimensional deviations in the glass components drawn by using the heating tube, as has already been explained above with reference to the method of the invention.

The apparatus of the invention serves to find a "sweet spot" in the disturbed temperature field of the heating tube and to ensure an exact and reproducible installation of the glass cylinder in the "sweet spot" found.

To this end a sensing means is provided for exactly sensing first the initial radial xy-position of the glass cylinder in a first horizontal sensing plane inside the heating tube. The sensing means comprises optical, electrical, magnetic, capacitive or inductive sensors for determining the coordinates of the xy-position of the glass cylinder.

A test glass strand is drawn from the glass cylinder. A measuring means is provided for measuring an actual state of a radial circular or annular dimension of the test glass strand. Deviations between the actual state and a desired state of the corresponding circular or annular dimension are quantified, i.e. both with respect to magnitude and deviation and with respect to their relative position in relation with the inner wall of the heating tube during drawing.

The deviations determined are used for calculating a corrected xy-position of the longitudinal cylinder axis inside the heating tube. The displacement vector from the one xy-position to the corrected xy-position is e.g. calculated in a microprocessor and has been explained above with respect to the method of the invention.

The glass cylinder is installed in the corrected xy-position by way of a displacement means such that the longitudinal cylinder axis extends at least in the first horizontal sensing plane in the corrected xy-position. The exact positioning of the glass cylinder in the corrected xy-position can be controlled by means of the sensing means.

With the apparatus of the invention the position of the glass cylinder can be exactly sensed in the first sensing plane and a predetermined change in the position can be adjusted in a reproducible manner.

Advantageous developments of the apparatus of the invention become apparent from the subclaims. To the extent that configurations of the apparatus indicated in the subclaims copy the procedures mentioned in subclaims regarding the method according to the invention, reference is made to the above observations made on the corresponding method claims for additional explanation.

Figure 2:
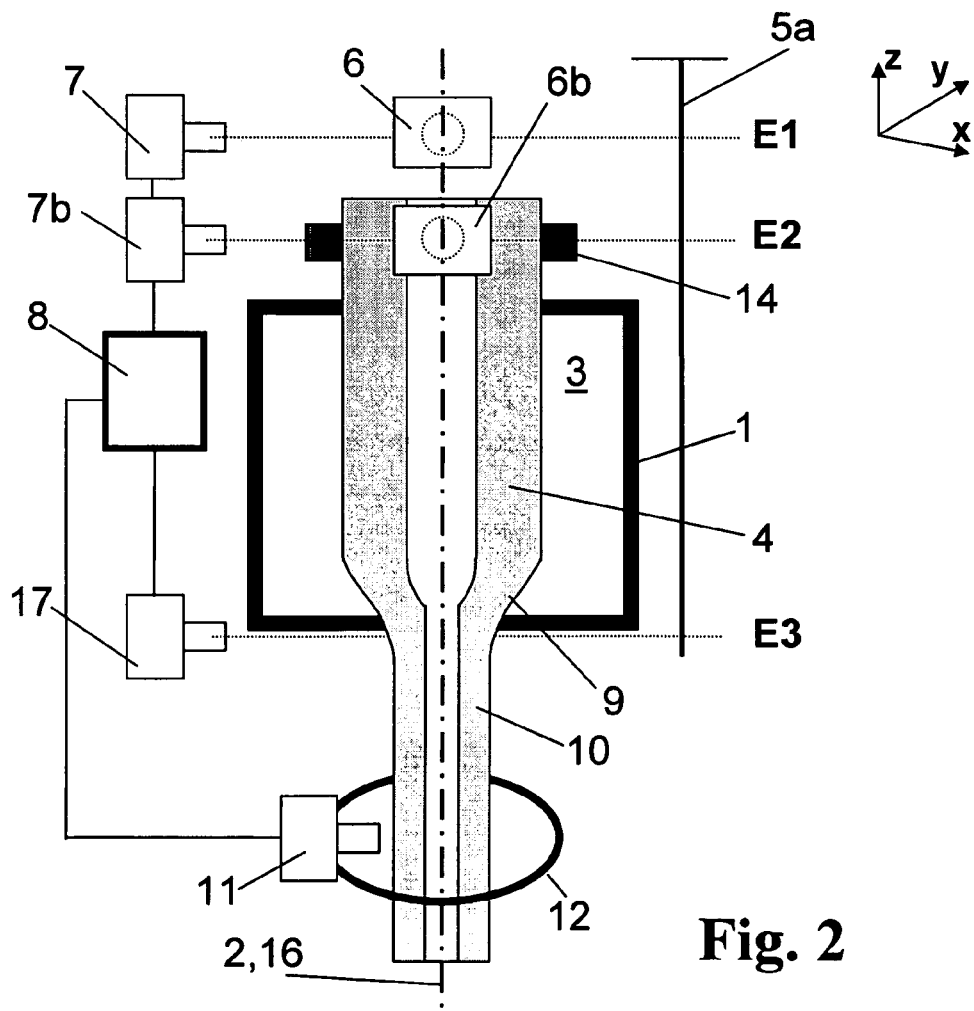

The invention shall now be explained in more detail with reference to a drawing. The drawing is a schematic illustration showing in detail in:

FIG. 1 a top view on an apparatus according to the invention in the area of a first sensing plane E1 above the heating tube from above;

FIG. 2 a corresponding side view of the apparatus; and

Figure 3:
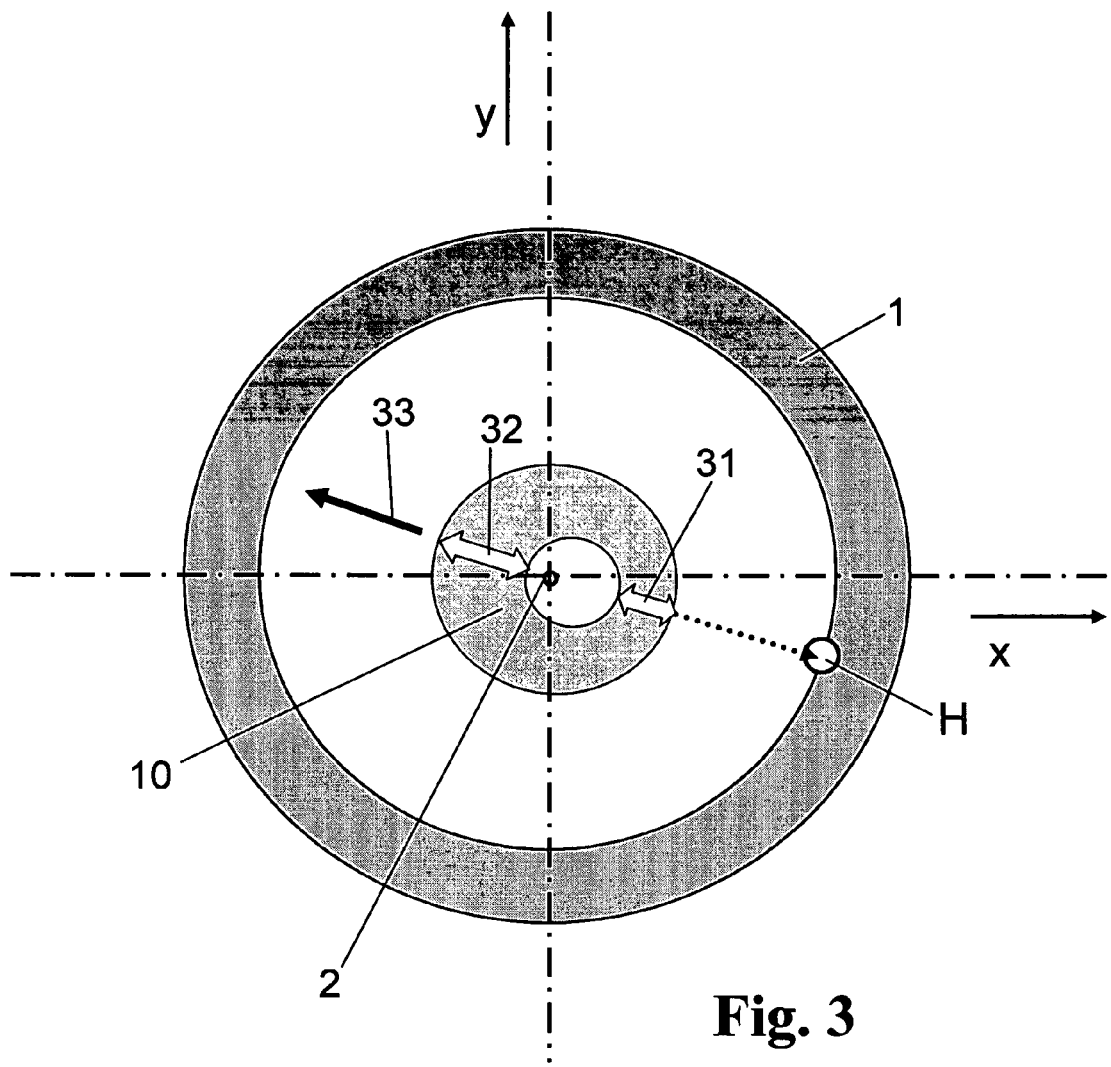

FIG. 3 an enlarged illustration of the heating tube and a tubular strand with a viewing direction from below onto the heating tube.

The apparatus according to FIG. 1 comprises a resistance type heating furnace which essentially consists of a vertically oriented heating tube 1 of graphite which encloses a heating zone 3 that is circular in cross section. The view of FIG. 1 shows a horizontal section above the heating tube 1 (first sensing plane E1), a coordinate system being plotted with the axes thereof representing the x-direction and the y-direction in the first sensing plane E1, and with the center point thereof extending through the central axis 2 of the heating tube 1, which is plotted as point (2).

Verticals 5a, 5b extending outside the heating tube are also marked by points (5a, 5b) in the top view of FIG. 1. The verticals 5a, 5b extend in parallel with the central axis 2 of the heating tube 1, and they mark the position thereof in x-direction (vertical 5a) and in y-direction (vertical 5b).

A hollow cylinder 4 of quartz glass, whose longitudinal axis 16 is aligned in parallel, if possible, with the central axis 2 of the heating tube 1, projects into the upper open end of the heating tube 1. In the view of FIG. 1, the longitudinal axis 16 of the hollow cylinder 4 is located at the level of the first sensing plane E1 exactly on the central axis 2 of the heating tube 1.

At the level of a first sensing plane E1 (above the upper end of the heating tube 1), two CCD cameras 6 and 7 are arranged, which in viewing directions perpendicular to each other are each directed onto the central axis 2 and onto the opposite verticals 5a, and 5b, respectively. The verticals 5a and 5b form a fixed point of reference for the heating tube 1, so that the CCD cameras 6, 7 are positioned in a defined way on account of their orientation on the verticals 5a and 5b relative to the heating tube 1. The CCD cameras 6 and 7 are each connected to a computer 8.

In a second sensing plane E2, which is spaced apart from the first sensing plane E1, but still extends above the heating tube 1, two further CCD cameras 6b, 7b are arranged with a viewing direction of 90° relative to each other, as can be seen in the side view of FIG. 2. The CCD cameras 6b and 7b are also oriented with respect to the verticals 5a, 5b and connected to the computer.

FIG. 2 further shows that the hollow cylinder 4 is connected to a displacement means 14 by means of which it can be displaced in horizontal direction (xy). The hollow cylinder 4 is softened in the heating chamber 3, and a tube 10 is drawn off vertically downwards from the softened area with formation of a drawing bulb 9. The tube 10 is passed through a sliding contact ring 12 in this process, the ring simultaneously serving as a guide rail for a wall-thickness measuring device 11 which is rotatable about the outer circumference of the tube 10. With the wall-thickness measuring device 11, which is also connected to the computer 8, a wall thickness profile of the drawn-off tube 10 can be recorded during the drawing process, and said profile can be evaluated with the help of the computer 8.

Underneath the heating tube 1 and still in the area of the drawing bulb 9 of the hollow cylinder 4 of quartz glass, a third sensing plane E2 is provided and has arranged therein a wall-thickness measuring device 17 which supplies a measurement value for the draw-off control, as is described in EP 0 767 148 A1.

A wall thickness profile of the drawn-off tubular strand 10, as is measured at a level of the ring 12 by means of the wall-thickness measuring device 11, is schematically shown in FIG. 3. This also yields the spatial orientation of the profile relative to the heating tube 1, as will be explained in more detail below.

An embodiment for carrying out the vertical drawing method according to the invention for producing a quartz glass tube shall now be explained in more detail with reference to FIGS. 1 to 3.

In the vertically oriented heating tube 1, a hollow cylinder 4 of quartz glass with an outer diameter of 200 mm and an inner diameter of 100 mm is first adjusted such that its longitudinal axis 16 extends in the first sensing plane E1 in the central axis 2 of the heating tube 1. To this end the hollow cylinder 4 is adjusted by means of a displacement device (not shown in the figures) which can be positioned by the computer. The verticals 5a and 5b serve as an adjusting device. This first orientation of the hollow cylinder 4 is performed by hand or in a computer-controlled manner. On the basis of a vision edge, the position of the hollow cylinder 4 of quartz glass within the heating tube 1 is sensed by means of the CCD cameras 6 and 7 and the corresponding xy-coordinates are stored in computer 8.

The hollow cylinder 4 of quartz glass that is positioned in the central axis 2 of the heating tube 1 is subsequently lowered at a given advance rate into the heating tube 1 and is heated therein to a temperature above 2100° C., the quartz glass tube 10 being drawn off from the evolving drawing bulb 9 at a controlled drawing rate to a desired outer diameter of 30 mm and a desired wall thickness of 3 mm.

At the same time, the vertical orientation of the hollow cylinder 4 of quartz glass is sensed by means of the two CCD cameras 6b and 7b, and this measurement value is also stored in the computer 8 and used for a corresponding adjustment.

A wall thickness profile of the drawn-off tubular strand 10 is continuously generated by means of the wall-thickness measuring device 11 rotating about the tubular strand 10 and is evaluated in the computer 8 such that the amount of the wall one-sidedness (maximum value minus minimum value of the wall thickness) and position of the minimum wall thickness relative to the inner wall of the heating tube 1 is determined.

On the basis of the deviation from the ideal geometry, as determined in the wall thickness distribution, the horizontal xy-position of the hollow cylinder 4 is corrected by way of a displacement of its longitudinal axis 16 in the first sensing plane E1, as shall be explained in the following by way of an example with reference to FIG. 3.

The correction step for the displacement of the longitudinal axis 16 of the hollow cylinder in the first sensing plane E1 includes a) finding the thinnest spot in the wall thickness of the drawn-off tubular strand 10, and b) determining the position of the thinnest place of the wall thickness relative to the heating tube 1, and c) determining the amount of the deviation of the wall thickness of the tube (maximum value-minimum value).

FIG. 1 is a view from below onto the heating tube 1 and the drawn-off tube 10. As can be seen, the cross-sectional profile of the tubular strand 10 has an asymmetry. In the embodiment the area of the thinnest wall thickness lies in the sector field at the right side at the bottom and opposite to a place of the heating tube 1 that is designated by "H". The minimum wall thickness is marked by the block arrow 31 and the maximum wall thickness by the block arrow 32. The difference between minimum and maximum wall thickness in the cross-sectional plane is 0.12 mm.

For correcting said deviation, the hollow cylinder 4 of quartz glass is moved some way to the left, i.e. away from point "H", namely in the direction of a normal to the heating tube wall at place "H", as illustrated by the directional arrow 33. The path (S) of the displacement movement of 1.2 mm is obtained with the help of the formula: $S=0.06 \times K$, where the correction factor K must be determined empirically for each heating furnace and is 20 in this case.

Hence, this calculation yields a corrected position of the xy-position of the hollow cylinder 4 of quartz glass in the first sensing plane E1. Due to a corresponding displacement of the central axis of the hollow cylinder 4, a wall one-sidedness of zero would be obtained in theory. On the other hand, a displacement of the central axis of the hollow cylinder might create bending problems. In practice, the displacement of the central axis is thus set to be as small as possible but as large as necessary, so that the resulting wall one-sidedness remains with the scope of the approved specification. In the above embodiment a wall one-sidedness of 0.05 is acceptable, so that the path A of the displacement movement to be actually realized in practice has a length of 1.4 mm (A=(0.12−0.05)× 20).

With the help of the displacement device the hollow cylinder 4 of quartz glass is displaced in a computer-controlled manner to said corrected xy-position.

The tubular strand 10 is further drawn off and the effect of the performed correction on the profile of the wall thickness of the drawn-off tube 10 is continuously monitored by means of the wall-thickness measuring device 11. To this end it is checked after a draw-off length of 4 m whether the wall thickness distribution of the drawn-off glass tube 10 is now satisfactorily close to the desired state. If necessary, the coordinates of the corrected xy-position found in this way are used as start coordinates for future drawing processes under the same conditions (identical heating tube, same geometry of the hollow cylinder). Otherwise, the above-described correction step is carried out again, and further corrected xy-positions are determined for the hollow cylinder 4 until a "sweet spot" inside the heating tube 1 has been found where a sufficiently accurate cylinder symmetry of the drawn-off tube is obtained.

Irrespective of this, the wall thickness of the drawn-off tube 10 is controlled using the measurement result produced by the wall-thickness measuring device 7 at an early stage.

As soon as a "sweet spot" and the corresponding xy-position of the hollow cylinder 4 of quartz glass has been found in the first sensing plane E1, which yields satisfactory results with respect to the wall thickness profile in the tubular strand 10, the vertical orientation of the hollow cylinder 4 is optimized in the drawing axis. To this end the position of the hollow cylinder 4 of quartz glass relative to the vertical 5 is determined by means of the CCD cameras 6b and 7b and is corrected in case of a deviation such that the hollow cylinder also extends in the second horizontal sensing plane E2 in the xy-position.

The drawn-off tubular strand is cut to size to obtain substrate tubes having a length of 1.50 m.

The invention claimed is:

1. A vertical drawing method for producing a cylindrical glass body, said method comprising:
   continuously feeding a glass cylinder to a heating zone having a vertically oriented heating tube;
   zonewise softening the glass cylinder;
   drawing a glass strand from the softened glass cylinder; and
   cutting the glass strand to size to obtain the cylindrical glass body; and
   an adjusting operation that comprises sensing a value for a first xy-position of a longitudinal cylinder axis of the glass cylinder or of a test glass cylinder in a first horizontal sensing plane, softening the glass cylinder or the test glass cylinder in the heating zone, with the longitudinal axis thereof extending through the heating tube and through the first xy-position in the first horizontal sensing plane, and drawing the glass cylinder or the test glass cylinder arranged in the first xy-position into a test glass strand, and carrying out the following steps once or repeatedly:
   a) measuring an actual state of a radial circular or annular dimension of the test glass strand,
   b) determining a deviation between the actual state and a desired state of the circular or annular dimension relative to a magnitude and position of said deviation relative to an inner wall of the heating tube during drawing,
   c) calculating a corrected xy-position of the longitudinal axis on the basis of a correction factor and the magnitude and position of the deviation, said corrected xy position being such that heating of the glass cylinder extending through the heating tube with the longitudinal axis thereof in said corrected xy-position is improved,
   d) repositioning the glass cylinder or the test glass cylinder in the heating tube such that the longitudinal cylinder axis extends at least in the first horizontal sensing plane in the corrected xy-position, and
   e) drawing the glass cylinder or the test glass cylinder in the corrected xy-position to obtain a further test glass strand; and
   wherein the test glass strand is tubular, and wherein the measurement of the actual state of radial circular or annular dimension of the test glass strand comprises measuring at each of a plurality of measurement points distributed around a circumference of the test glass strand a respective wall thickness of the tubular test glass strand, and
   said deviation determined is a determined degree of lopsidedness and a determined direction of lopsidedness of the test glass strand.

2. The method according to claim 1, wherein the sensing of the value for the first radial xy-position comprises producing an optical image of the glass cylinder in the first sensing plane and at least part of the heating tube or a calibration body in stationary relation with the heating tube, and evaluating the optical image.

3. The method according to claim 1, wherein the tubular test glass strand is drawn with an outer diameter of not more than 50 mm.

4. The method according to claim 1, wherein the measurement of the actual state of radial circular or annular dimension of the test glass strand is carried out during drawing.

5. The method according to claim 1, wherein the measurement of the actual state of radial circular or annular dimension of the test glass strand is carried out on pieces of the test glass strand that have been cut to length, using a stationary wall thickness measuring device.

6. The method according to claim 1, wherein in a tubular test glass strand, the first xy-position and the corrected xy-position are separated by a distance A, as defined by the following dimensioning rule:

$$A = K \times \text{wall lopsidedness}$$

where K is a correction factor ranging between 5 and 40 and the wall lopsidedness is determined as a differential amount between a maximum value and a minimum value of the measured wall thicknesses.

7. The method according to claim 1, wherein a value is determined for the first xy-position of the longitudinal cylinder axis of the glass cylinder in a second horizontal sensing plane.

8. The method according to claim 1, wherein the glass cylinder in the heating tube is moved by computer-controlled transportation of the glass cylinder to the corrected xy-position.

9. The method according to claim 1, wherein the glass cylinder is of test material.

10. The method according to claim 1, wherein the cylindrical glass body is quartz glass.

11. The method according to claim 1, wherein the tubular test glass strand is drawn with an outer diameter between 10 mm and 20 mm.

12. A method for drawing a glass body from a glass cylinder, said method comprising:
   positioning the glass cylinder in a vertically oriented heating tube;

feeding said glass cylinder continuously to a heating zone in the heating tube and softening the glass cylinder therein;

drawing a glass strand from the softened glass cylinder; and cutting the glass strand to size to obtain the cylindrical glass body;

said positioning of the glass cylinder comprising drawing a test strand from the cylinder or from a test cylinder supported with a longitudinal axis thereof extending vertically through an xy-position in a generally horizontal sensing plane, the cylinder or test cylinder being softened in the heating zone, measuring a geometrical attribute of the test strand;

deriving a deviation of the geometrical attribute from a desired value of said geometrical attribute, deriving a corrected xy-position from said deviation, such that heating of the glass cylinder extending through the heating tube with the longitudinal axis thereof in said corrected xy-position is improved, and positioning the cylinder or the test cylinder so that the longitudinal axis thereof extends through the corrected xy-position, wherein the geometrical attribute includes a data value indicative of a degree of lopsidedness of the test strand and a data value indicative of the orientation of lopsidedness of the test strand relative to the heating tube, and wherein the test strand is tubular, and the data values indicative of lopsidedness are derived from a plurality of measurements of wall thicknesses of the tubular test strand distributed around a circumference of the test strand.

13. The method of claim 12, wherein the steps of drawing, measuring, deriving, and positioning are repeated to yield a second corrected xy-position to which the cylinder is moved.

14. The method of claim 12, wherein the xy-position is sensed by producing and evaluating an optical image of the glass cylinder in the horizontal sensing plane, and said positioning of the cylinder is accomplished automatically by a processor responsive to the sensed xy-position and the geometrical property.

15. The method according to claim 12, wherein the data value of degree of lopsidedness is determined as a differential amount between a maximum value and a minimum value of the measured wall thicknesses.

16. A method of producing a cylindrical glass body, said method comprising:

continuously feeding a glass cylinder along a vertically oriented longitudinal axis of the glass cylinder to a heating zone having a vertically oriented heating tube;

softening the glass cylinder in the heating zone;

drawing a glass strand downward from the softened glass cylinder; and cutting the glass strand to size to obtain the cylindrical glass body;

wherein the method further comprises performing an xy-position adjustment prior to said softening and drawing, said xy-position adjustment comprising heating a test cylinder or a portion of the glass cylinder in the heating zone with a longitudinal axis thereof extending vertically through a first xy-position in a horizontal plane, drawing a test glass strand from the test cylinder or a portion of the glass cylinder, and measuring a geometrical property of the test strand indicative of a deviation of the test strand from a desired circular or annular state of the test strand, wherein the test strand is tubular, and the geometrical attribute includes a plurality of measurements of wall thickness of the test glass strand distributed about a circumference thereof, determining data values defining a degree and direction of lopsidedness of the test glass strand from said plurality of measurements of wall thickness of the test glass strand, and determining an adjusted xy-position from the first xy-position and the data values defining a degree and direction of lopsidedness of the test glass strand such that when the glass cylinder extends through the heating zone with the longitudinal axis thereof extending through the adjusted xy-position, lopsidedness of a tube drawn therefrom is reduced relative to lopsidedness of the test strand.

17. The method according to claim 16, wherein the first xy-position is detected by sensing the first xy-position in a horizontal sensing plane.

18. The method of claim 16, wherein the cylindrical body is a hollow quartz glass cylinder.

19. The method of claim 16, wherein the cylindrical body is a quartz glass rod.

20. The method of claim 16 wherein a computer controls movement of the glass cylinder to the adjusted xy-position.

21. The method of claim 16, wherein the test cylinder is used in the drawing from the first xy-position, and the test cylinder is of test material, and the glass cylinder is of quartz glass of a higher quality that the test material.

22. The method according to claim 16, wherein the first xy-position and the adjusted xy-position are separated by a distance A, as defined by the following equation:

$$A = K \times \text{wall lopsidedness}$$

wherein K is a correction factor ranging between 5 and 40, and the wall lopsidedness is determined as a differential amount between a maximum value and a minimum value of the measured wall thickness thicknesses.

* * * * *